(12) United States Patent
Takeshita (10) Patent No.: US 12,533,808 B2
(45) Date of Patent: Jan. 27, 2026

(54) TRAJECTORY GENERATION SYSTEM, TRAJECTORY GENERATION METHOD, AND NON-TRANSITORY STORAGE MEDIUM

(71) Applicant: TOYOTA JIDOSHA KABUSHIKI KAISHA, Toyota (JP)

(72) Inventor: Keisuke Takeshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 18/598,026

(22) Filed: Mar. 7, 2024

(65) Prior Publication Data

US 2024/0308072 A1 Sep. 19, 2024

(30) Foreign Application Priority Data

Mar. 14, 2023 (JP) ................. 2023-039422

(51) Int. Cl.
*B25J 9/16* (2006.01)

(52) U.S. Cl.
CPC ............. *B25J 9/1666* (2013.01); *B25J 9/161* (2013.01); *B25J 9/163* (2013.01)

(58) Field of Classification Search
CPC .......... B25J 9/161; B25J 9/163; B25J 9/1666
See application file for complete search history.

(56) References Cited

U.S. PATENT DOCUMENTS

| 11,392,127 B2* | 7/2022 | Akella ................. G05D 1/0088 |
| 2020/0189101 A1 | 6/2020 | Terada |
| 2022/0305657 A1* | 9/2022 | Hong ................... G05D 1/0223 |
| 2022/0402135 A1* | 12/2022 | Bremer .............. G05B 19/4155 |

FOREIGN PATENT DOCUMENTS

JP 7028151 B2 3/2022

* cited by examiner

*Primary Examiner* — Wade Miles
*Assistant Examiner* — Zachary Joseph Wallace
(74) *Attorney, Agent, or Firm* — Oliff PLC (57) ABSTRACT

A trajectory generation system includes one or more processors configured to: continuously generate a first trajectory candidate and a second trajectory candidate in parallel, the second trajectory candidate being generated at a lower generation rate than a generation rate of the first trajectory candidate and being more likely to be passable by a moving body than the first trajectory candidate; and generate a trajectory using either or both of a generated first trajectory candidate that is passible by the moving body and the generated second trajectory candidate.

9 Claims, 9 Drawing Sheets

TRAJECTORY GENERATION SYSTEM, TRAJECTORY GENERATION METHOD, AND NON-TRANSITORY STORAGE MEDIUM

CROSS-REFERENCE TO RELATED APPLICATION

This application claims priority to Japanese Patent Application No. 2023-039422 filed on Mar. 14, 2023, incorporated herein by reference in its entirety.

BACKGROUND

1. Technical Field

The present disclosure relates to trajectory generation systems, trajectory generation methods, and non-transitory storage media.

2. Description of Related Art

A trajectory generation device disclosed in Japanese Patent No. 7028151 (JP 7028151 B) includes a calculation unit, an evaluation unit, and a check unit. The calculation unit generates a plurality of trajectory candidates that can move a moving body or a grip unit from a start position to a target position. The evaluation unit evaluates the trajectory candidates based on evaluation items. The check unit checks the feasibility of avoiding an interfering object in order from the trajectory candidate with the highest evaluation, and selects the trajectory candidate that satisfies the feasibility. The calculation unit generates a trajectory using the selected trajectory candidate.

SUMMARY

A trajectory generation system using a rapidly-exploring random tree (RRT) method is known in the art. The RRT method is sometimes used for generation of training data in the field of artificial intelligence (AI) such as machine learning and deep learning.

The inventors found the following technical problem. In the trajectory generation device disclosed in JP 7028151 B, the calculation unit may keep generating trajectory candidates that do not satisfy the feasibility of the moving body avoiding an interfering object. In such a case, a trajectory cannot be generated until the calculation unit generates a trajectory candidate that satisfies the feasibility of the moving body avoiding an interfering object.

The present disclosure provides a trajectory generation system, a trajectory generation method, and a non-transitory storage medium.

A trajectory generation system according to a first aspect of the present disclosure is a trajectory generation system including one or more processors configured to: continuously generate a first trajectory candidate and a second trajectory candidate in parallel, the second trajectory candidate being generated at a lower generation rate than a generation rate of the first trajectory candidate and being more likely to be passable by a moving body than the first trajectory candidate; and generate a trajectory using either or both of a generated first trajectory candidate that is passible by the moving body and the generated second trajectory candidate.

A trajectory generation method according to a second aspect of the present disclosure is a trajectory generation method that is performed by a trajectory generation system. The method includes: continuously generating a first trajectory candidate and a second trajectory candidate in parallel, the second trajectory candidate being generated at a lower generation rate than a generation rate of the first trajectory candidate and being more likely to be passable by a moving body than the first trajectory candidate; and generating a trajectory using either or both of a generated first trajectory candidate that is passable by the moving body and the generated second trajectory candidate.

A non-transitory storage medium according to a third aspect of the present disclosure is a non-transitory storage medium storing instructions that are executable by one or more processors and that cause the one or more processors to perform functions. The functions include: continuously generating a first trajectory candidate and a second trajectory candidate in parallel, the second trajectory candidate being generated at a lower generation rate than a generation rate of the first trajectory candidate and being more likely to be passable by a moving body than the first trajectory candidate; and generating a trajectory using either or both of a generated first trajectory candidate that is passable by the moving body and the generated second trajectory candidate.

According to the present disclosure, it is possible to appropriately generate a trajectory.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. The present disclosure is not limited to the following embodiments. The following description and the drawings are simplified as appropriate for clarity.

First Embodiment

A trajectory generation system according to a first embodiment will be described with reference to FIG. 1. The trajectory generation system according to the first embodiment generates a trajectory that moves, for example, a grip unit of a moving body, such as a hand of a robot.

Figure 1:
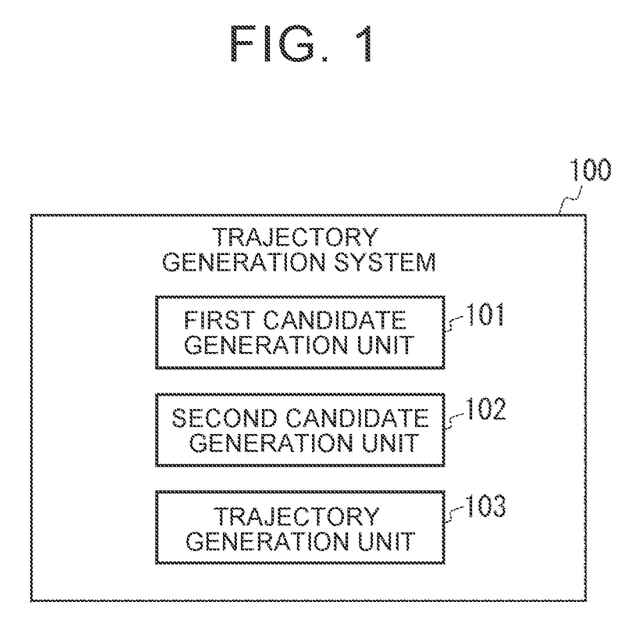
FIG. 1 is a block diagram showing the configuration of a trajectory generation system according to a first embodiment.

As shown in FIG. 1, a trajectory generation system 100 includes a first candidate generation unit 101, a second candidate generation unit 102, and a trajectory generation unit 103.

The first candidate generation unit 101 and the second candidate generation unit 102 continuously generate first trajectory candidates and second trajectory candidates in parallel, respectively. In other words, the first candidate generation unit 101 continuously generates first trajectory candidates, and the second candidate generation unit 102 continuously generates second trajectory candidates. Generation of the first trajectory candidates by the first candidate generation unit 101 and generation of the second trajectory candidates by the second candidate generation unit 102 are performed in parallel.

The generation rate of the second trajectory candidates is lower than the generation rate of the first trajectory candidates. The second trajectory candidates are more likely to be passable by a moving body, not shown, than the first trajectory candidates.

The trajectory generation unit 103 generates a trajectory using either or both of a first trajectory candidate and a second trajectory candidate that are generated by either or both of the first candidate generation unit 101 and the second candidate generation unit 102 and that are passable by the moving body.

For example, the trajectory generation unit 103 may generate a trajectory using a first trajectory candidate that is passable by the moving body or a second trajectory candidate according to the order in which the first trajectory candidate that is passable by the moving body and the second trajectory candidate are generated. Specifically, when the first candidate generation unit 101 generates the first trajectory candidate that is passable by the moving body before the second trajectory candidate is generated, the trajectory generation unit 103 generates a trajectory using the first trajectory candidate that is passable by the moving body. When the second candidate generation unit 102 generates the second trajectory candidate before the first trajectory candidate that is passable by the moving body is generated, the trajectory generation unit 103 generates a trajectory using the second trajectory candidate.

When a plurality of passable trajectory candidates is generated by the first candidate generation unit 101 and the second candidate generation unit 102, the trajectory generation unit 103 may generate a trajectory using one of the generated passable trajectory candidates. The generated passable trajectory candidates may include at least two of the first trajectory candidate that is passable by the moving body and the second trajectory candidate.

As described above, according to the configuration of the trajectory generation system 100, the trajectory generation unit 103 generates a trajectory using a first trajectory candidate that is passable by the moving body or a second trajectory candidate according to the order in which the first trajectory candidate that is passable by the moving body and the second trajectory candidate are generated. When the first candidate generation unit 101 is able to generate a passable first trajectory candidate before a second trajectory candidate is generated, the trajectory generation unit 103 generates a trajectory using the passable first trajectory candidate. Therefore, the trajectory generation unit 103 can generate a passable trajectory at a high generation rate. Even when the first candidate generation unit 101 is not able to generate a passable first trajectory candidate, the trajectory generation unit 103 generates a trajectory using a second trajectory candidate. This can reduce the possibility that a trajectory cannot be generated. It is also possible to reduce a delay in trajectory generation due to the first candidate generation unit 101 not being able to generate a passable first trajectory candidate.

Next, a specific example of the trajectory generation system according to the first embodiment will be described with reference to FIGS. 2 to 5. First, the configuration of a specific example of a moving body including a trajectory generation device will be described. Thereafter, a method for generating a trajectory of the moving body and a grip unit by the trajectory generation device will be described.

Configuration of Moving Body

Figure 2:
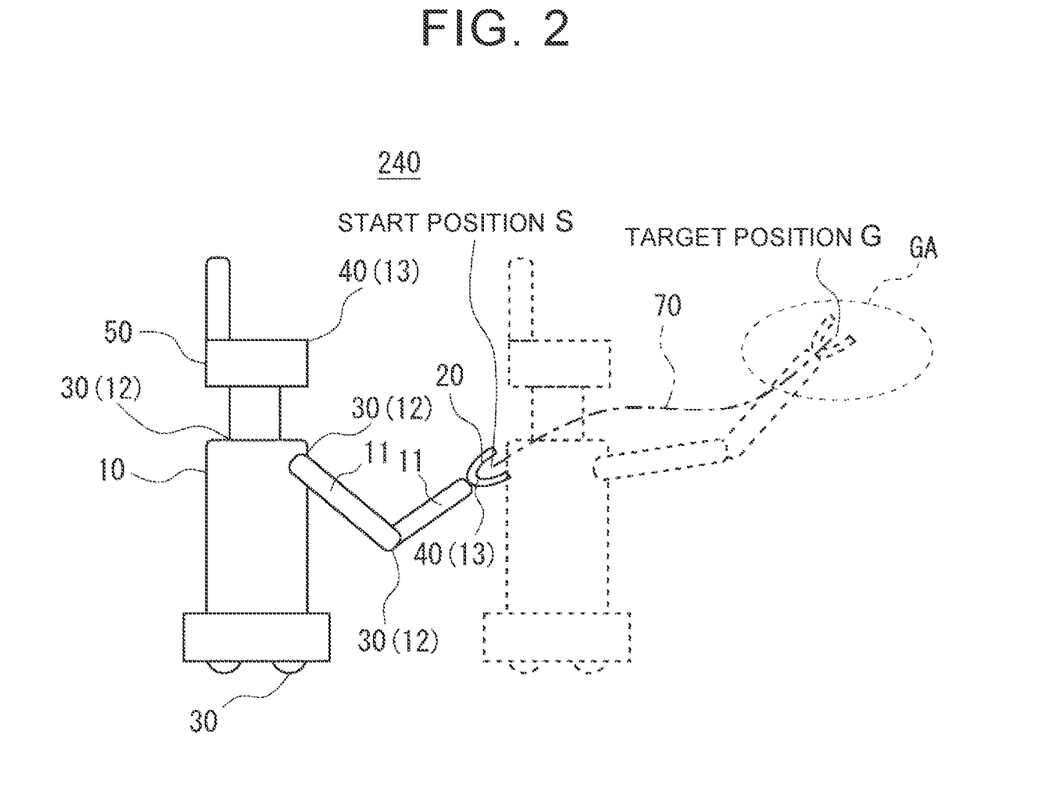
FIG. 2 illustrates a hardware configuration of a moving body according to the first embodiment.
Figure 3:
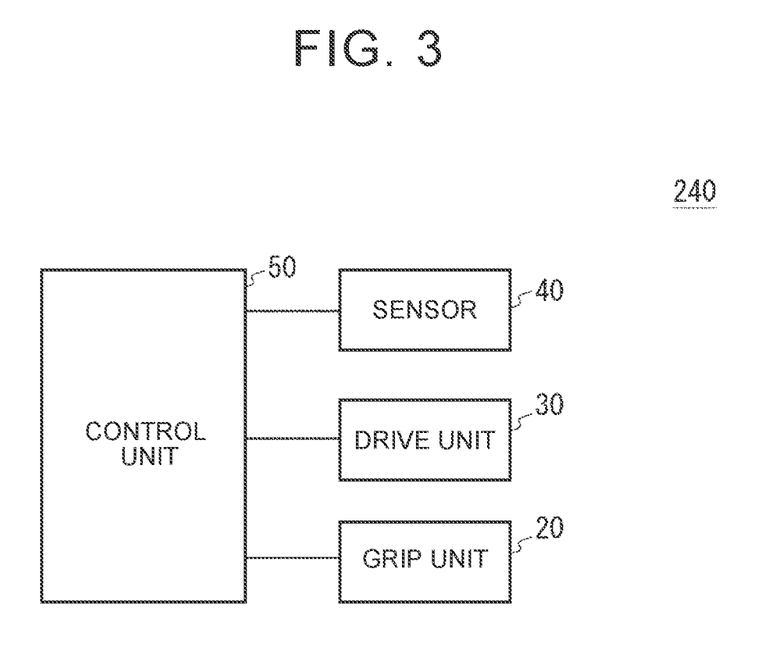
FIG. 3 is a block diagram illustrating the configuration of a control system of the moving body according to the first embodiment.

FIG. 2 illustrates a hardware configuration of a moving body 240 according to the first embodiment. FIG. 3 is a block diagram illustrating the configuration of a control system of the moving body 240 according to the first embodiment. As shown in FIGS. 2 and 3, the moving body 240 preferably includes a main body 10, links 11, joints 12, a grip unit 20, drive units 30, a sensor 40, and a control unit 50. Specifically, the moving body 240 may be a robot, and more specifically, may be a Human Support Robot (HSR) that is safe and small and performs physical work.

The main body 10 forms the torso of the moving body 240. The grip unit 20 of the moving body 240 is attached to the main body 10. The drive unit 30 for moving the main body 10, such as wheels and a motor for rotating the wheels, is attached under the main body 10. For example, the main body 10 moves by rotation of the wheels. The drive unit 30 for moving the main body 10 is not limited to the wheels and the motor for rotating the wheels, but may be two legs that walk, etc.

The links 11 and the joints 12 are provided between the main body 10 and the grip unit 20. The links 11 and the joints 12 attach the grip unit 20 to the main body 10. The links 11 are, for example, members in the form of a rod, and serves as so-called bones. The joints 12 rotatably or translatably connect members between the main body 10 and the link 11, between the links 11, between the link 11 and the grip unit 20, etc. Each joint 12 is provided with the drive unit 30. The drive units 30 for the joints 12 are, for example, actuators. The joints 12 are driven to rotate or translate by the drive units 30.

The grip unit 20 is, for example, a hand of a robot. The grip unit 20 is attached to the main body 10 via the links 11 and the joints 12. Accordingly, the grip unit 20 moves by rotation or translation of the joints 12.

The drive units 30 are the wheels and the motor for rotating the wheels, both attached under the main body 10, and the actuators for rotating or translating the joints 12. As the main body 10 moves, the grip unit 20 also moves accordingly.

The sensor 40 detects the position of the moving body 240. Specifically, the sensor 40 detects the positions of the main body 10 and the grip unit 20. For example, the sensor 40 is a camera 13 that is attached above the main body 10 and that captures images of the main body 10, the grip unit 20, and their surroundings. The camera 13 is attached to the main body 10 via the joint 12. The camera 13 can change the imaging direction by the drive unit 30 of the joint 12. The sensor 40 may be a camera 13 attached to the grip unit 20. The camera 13 on the grip unit 20 captures an image of an object to be gripped. The camera 13 on the grip unit 20 can change the imaging direction by movement of the grip unit 20. The camera 13 has a variable angle of view, so that the camera 13 can capture images of near objects and far objects. The sensor 40 detects the positions of the main body 10 and the grip unit 20 based on the captured images.

The sensor 40 may be encoders provided in the motor and actuators in the drive units 30. The sensor 40 may detect the positions of the main body 10 and the grip unit 20 based on a measured rotation signal or translational displacement signal. The sensor 40 acquires the rotation angles or translational displacements of the joints 12. The sensor 40 outputs the detected position information, rotation angle information, and translational displacements to the control unit 50.

The sensor 40 also detects the velocity (speed and direction) and angular velocity (speed and direction) of the moving body 240. Specifically, the sensor 40 detects the velocities and angular velocities of the main body 10 and the grip unit 20. The sensor 40 may detect the velocities and angular velocities of the main body 10 and the grip unit 20 from a plurality of images captured at predetermined intervals by the camera 13, or may detect the velocities and angular velocities of the main body 10 and the grip unit 20 by the encoders provided in the motor and actuators. The sensor 40 outputs the detected velocity information and angular velocity information to the control unit 50.

The control unit 50 controls the operation of the moving body 240. The control unit 50 controls movements of the main body 10 and the grip unit 20 based on the positions, rotation angles, velocities (speeds and directions), and angular velocities (speeds and directions) of the main body 10 and the grip unit 20 detected by the sensor 40. Specifically, the control unit 50 controls movements of the main body 10 and the grip unit 20 by controlling the rotational angular velocities or translational velocities of the motors and the joints 12. The control unit 50 is, for example, a general-purpose computer. The control unit 50 acquires various types of information from an external device via a communication interface.

Configuration of Trajectory Generation System

Figure 4:
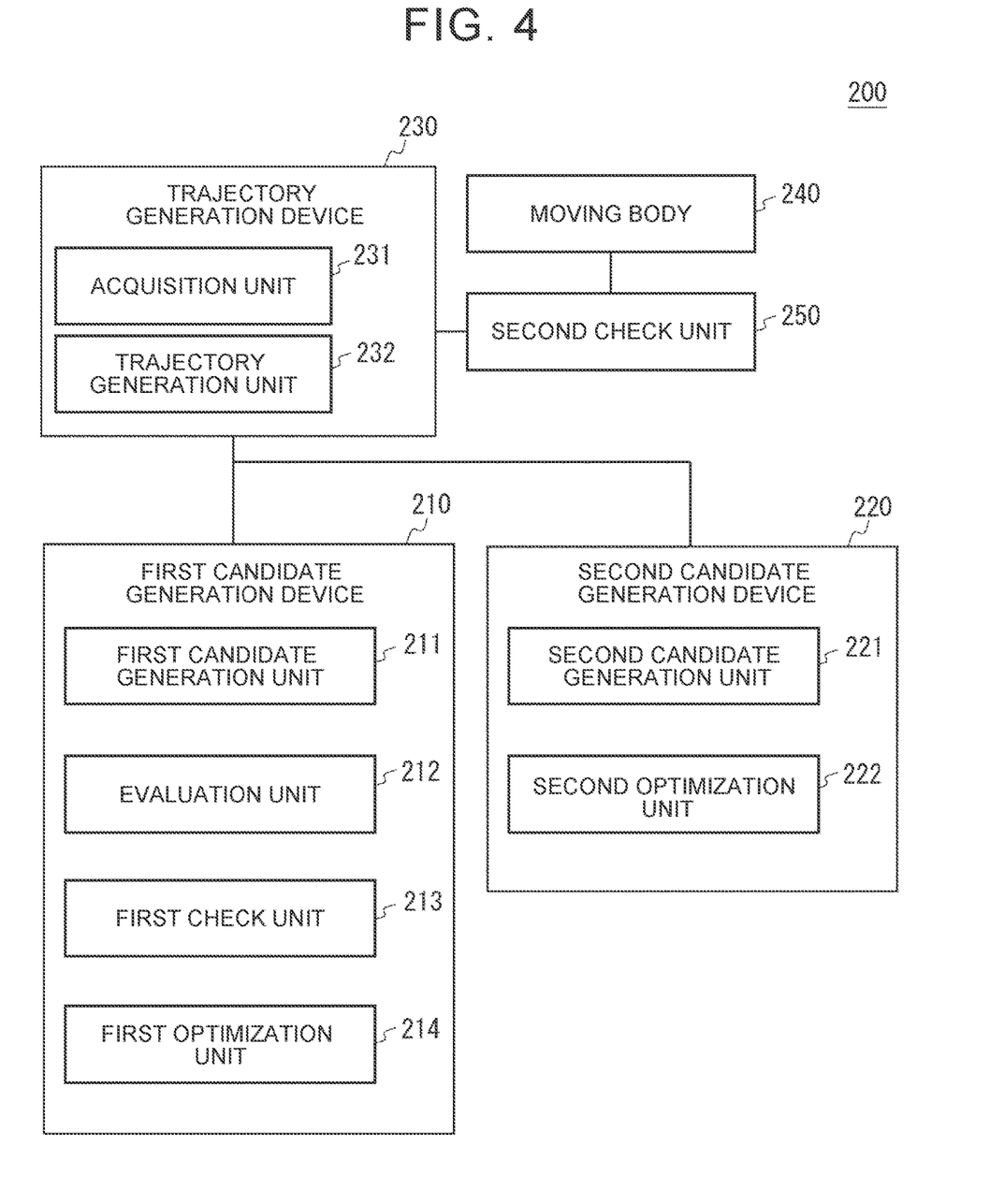
FIG. 4 is a block diagram showing the configuration of a specific example of the trajectory generation system according to the first embodiment.

FIG. 4 is a block diagram illustrating the configuration of a trajectory generation system 200 according to the first embodiment. As shown in FIG. 4, the trajectory generation system 200 includes a first candidate generation device 210, a second candidate generation device 220, a trajectory generation device 230, and a second check unit 250. The trajectory generation system 200 may be mounted on the moving body 240 shown in FIGS. 2 and 3, or may be provided at a position away from the moving body 240. Each of the first candidate generation device 210, the second candidate generation device 220, the trajectory generation device 230, and the second check unit 250 is preferably a computer. The computer includes an arithmetic processing unit, a storage device, a communication interface, etc.

The first candidate generation device 210 includes a first candidate generation unit 211, an evaluation unit 212, a first check unit 213, and a first optimization unit 214. A predetermined timeout time is set for each of the processes that are preformed by the first candidate generation unit 211, the evaluation unit 212, the first check unit 213, and the first optimization unit 214. The upper limits of the processing times of the first candidate generation unit 211, the evaluation unit 212, the first check unit 213, and the first optimization unit 214 are thus set, so that real-time capability is guaranteed.

The first candidate generation unit 211 is a specific example of the first candidate generation unit 101 shown in FIG. 1. The first candidate generation unit 211 performs a calculation to generate a first trajectory candidate for moving the moving body 240 or the grip unit 20 of the moving body 240 shown in FIG. 2 from a start position S to a target position G. Specifically, the first candidate generation unit 211 generates a plurality of first trajectory candidates, and uses the generated first trajectory candidates to generate the first trajectory candidate for moving the moving body 240 or the grip unit 20 of the moving body 240 from the start position S to the target position G.

The first candidate generation unit 211 performs a calculation to generate a plurality of first trajectory candidates to a target area GA including the target position G and the vicinity of the target position G shown in FIG. 2. The first trajectory candidates thus generated are candidates for a trajectory 70 to the target position G. The first trajectory candidates are trajectories that can be connected to the trajectory 70 along which the moving body 240 or the grip unit 20 moves in real time. The number of first trajectory candidates thus generated is, for example, several hundreds.

When generating a plurality of first trajectory candidates, the first candidate generation unit 211 may first generate a plurality of microtrajectory candidates to the target area GA having a certain range including the target position G and the vicinity of the target position G, rather than generating first trajectory candidates that will become the trajectory 70 to a single point, namely to the target position G. The microtrajectory candidate thus generated is an intermediate point on the trajectory 70. The first candidate generation unit 211 may generate a different microtrajectory candidate extending from the terminal point of the generated microtrajectory candidate. The first candidate generation unit 211 may generate a plurality of first trajectory candidates by repeating such generation. The range of the vicinity may vary for each calculation. For example, when the moving body 240 or the grip unit 20 is located far from the target position G, the range of the vicinity may be large, and when the moving body 240 or the grip unit 20 is located near the target position G, the range of the vicinity may be small. The first candidate generation unit 211 may generate the above microtrajectory candidate after generating a predetermined number of trajectory candidates to a single point, namely to the target position G. The first candidate generation unit 211 can thus immediately generate a trajectory candidate in an environment with no interfering object. The number of interpolation points is preferably set to a predetermined value, for example, 100. The number of interpolation points is preferably set according to the probability that it is determined that the moving body 240 can pass through the first trajectory candidate within a predetermined time while avoiding an interfering object. The range of the vicinity may be determined in association with predetermined grip conditions. By generating the plurality of microtrajectory candidates to the target area GA, a first trajectory candidate for moving the moving body 240 and the grip unit 20 in real time can be generated while maintaining a certain level of accuracy as a candidate for the trajectory 70.

The first candidate generation unit 211 preferably generates a plurality of first trajectory candidates with a plurality of degrees of freedom associated with each predetermined grip condition. The predetermined grip conditions refers to, for example, conditions for keeping the position and attitude of the moving body 240, the positions of the links 11, the rotation angles and translational displacements of the joints 12, the angle of view of the camera 13, etc. within predetermined ranges. A plurality of degrees of freedom is associated with each predetermined grip condition. For example, a plurality of degrees of freedom associated with a plurality of positions within the predetermined range can be set for the condition for keeping the position of the moving body 240 within the predetermined range. For example, a plurality of degrees of freedom associated with a plurality of angles or translational displacements within the predetermined range can be set for the condition for keeping the rotation angles or translational displacements of the joints 12 within the predetermined range.

For example, the grip conditions that are used by the first candidate generation device 210 according to the first embodiment is, for example, four constraint conditions. The four constraints are a goal hard constraint condition, a goal soft constraint condition, a path hard constraint condition, and a path soft constraint condition. The goal hard constraint condition and the goal soft constraint condition refer to the constraint conditions under which the grip unit 20 is to grip an object to be gripped. The path hard constraint condition and the path soft constraint condition refer to the constraint conditions for the trajectory 70 until the grip unit 20 grips an object to be gripped.

The goal hard constraint condition refers to, for example, a state that the moving body 240 and the grip unit 20 must be in at the target position G of the trajectory 70. Specifically, the grip unit 20 must be located at a position where it can grip an object to be gripped. The goal soft constraint is, for example, a state that the moving body 240 and the grip unit 20 are preferred to be in at the target position G on the trajectory 70. Specifically, the moving body 240 is preferred not to have an excessively extended attitude.

The path hard constraint condition refers to, for example, a state that the moving body 240 and the grip unit 20 must be in along the entire trajectory 70. Specifically, the grip unit 20 must take a straight trajectory when pulling a drawer of a desk etc. The path soft constraint is, for example, a state that the moving body 240 and the grip unit 20 are preferred to be in along the entire trajectory 70. Specifically, the moving body 240 is preferred not to move its hand while moving.

The first candidate generation unit 211 generates a plurality of first trajectory candidates within a range in which it can calculate first trajectory candidates within a predetermined period. The predetermined period is, for example, a period during which the first candidate generation unit 211 generates several hundreds of first trajectory candidates. The first candidate generation unit 211 periodically generates a plurality of first trajectory candidates at every predetermined period. The first candidate generation unit 211 may generate a plurality of first trajectory candidates within a range in which it can calculate first trajectory candidates with a predetermined amount of arithmetic processing. The first candidate generation unit 211 may generate a plurality of first trajectory candidates within a range in which it can calculate a predetermined number of first trajectory candidates. As described above, the first candidate generation unit 211 generates a plurality of first trajectory candidates to the target area GA including the target position G and the vicinity of the target position G, with a plurality of degrees of freedom associated with each predetermined grip condition and within any one of the following ranges: the range in which it can calculate first trajectory candidates within the predetermined period, the range in which it can calculate first trajectory candidates with the predetermined amount of arithmetic processing, and the range in which it can calculate the predetermined number of first trajectory candidates. The predetermined period, the predetermined amount of arithmetic processing, and the predetermined number may be any values as long as a plurality of first trajectory candidates can be generated, and may be a set period, set amount of arithmetic processing, and set number that are determined by setting.

For example, a plurality of first trajectory candidates is generated within the predetermined period. A trajectory candidate that will become the trajectory 70 is selected from the first trajectory candidates before the predetermined period elapses. The trajectory 70 along which the moving body 240 or the grip unit 20 is moving during the predetermined period is the one that was generated during the previous predetermined period. The first candidate generation unit 211 thus periodically generates a plurality of first trajectory candidates that can be connected to the trajectory 70 of the current predetermined period in the next period. The first candidate generation unit 211 preferably generates various trajectory candidates that satisfy predetermined hard constraint conditions as long as one predetermined period allows.

The evaluation unit 212 evaluates first trajectory candidates. Specifically, the evaluation unit 212 evaluates and ranks the plurality of generated first trajectory candidates based on evaluation items. The evaluation items include conditions for the trajectory length. The trajectory length is the length along a first trajectory candidate. The trajectory length may be calculated by weighting each joint 12. The trajectory length may be calculated by giving more weight to the components of the main body 10 out of the components of the moving body 240. This reduces movement of the components of the main body 10, which is desirable because movement of the components of the grip unit 20 is stabilized. The evaluation unit 212 may sort a plurality of first trajectory candidates in ascending order of trajectory length. The evaluation items that are used for ranking by the evaluation unit 212 may include, for example, soft constraints that are preferred to be satisfied.

The first check unit 213 determines whether the moving body 240 can pass through a first trajectory candidate while avoiding an interfering object. The first check unit 213 makes this determination in order from the first trajectory candidate with the highest evaluation among the plurality of first trajectory candidates evaluated by the evaluation unit 212. The first check unit 213 may make this determination using environment information acquired by an acquisition unit 231 that will be described later. Three-dimensional (3D) interference determination is performed. The first check unit 213 may determine the points included in the first trajectory candidate as sparsely as possible. For example, when the first trajectory candidate includes (N+1) points, the first check unit 213 determines the points in the order of 0, N, N/2, N/4, 3N/4, .... When the moving body 240 does not interfere with an interfering object at the determined Kth point, the moving body 240 is unlikely to interfere with the interfering object at the points around the Kth point, such as the (K−1)th point and the (K+1)th point. Therefore, it is possible to ensure the accuracy of the determination while reducing the number of points to be determined, and it is possible to make the determination efficiently. The first check unit 213 selects the first trajectory candidate through which the moving body 240 is determined to be able to pass while avoiding an interfering object.

The first candidate generation unit 211 may generate a trajectory using the first trajectory candidate selected by the first check unit 213. Specifically, the first candidate generation unit 211 sets a part on the start position S side of the first trajectory candidate selected by the first check unit 213 as a microtrajectory, and periodically connects the microtrajectory to the start position S or the immediately preceding microtrajectory at every predetermined period. Specifically, by a predetermined point in time, the first candidate generation unit 211 sets a part on the start position S side of the first trajectory candidate as a microtrajectory to be taken by the moving body 240 or the grip unit 20 within the predetermined period from the predetermined point in time, and connects the microtrajectory to the first trajectory candidate generated by the predetermined point in time. The first candidate generation unit 211 may generate, from the beginning, a trajectory that connects to a microtrajectory to be taken by the moving body 240 or the grip unit 20 within a predetermined time. In other words, all the trajectories evaluated by the evaluation unit 212 are trajectories connecting to microtrajectories.

The first candidate generation unit 211 thus generates a first trajectory candidate by periodically connecting a plurality of microtrajectories in order from the start position S side. The microtrajectory is a portion of the first trajectory candidate in which the moving body 240 or the grip unit 20 moves within a predetermined period.

The first optimization unit 214 optimizes driving of the moving body 240 or the grip unit 20 so that the moving body 240 and the grip unit 20 can move along the generated trajectory at the fastest allowable speed. Specifically, the first optimization unit 214 adjusts the drive units 30 to optimize driving of the main body 10, the links 11, the joints 12, and the camera 13. The first optimization unit 214 optimizes driving of the drive units 30 so that the moving body 240 and the grip unit 20 can actually move along the trajectory 70 indicated by the generated first trajectory candidate at the fastest allowable speed. The first optimization unit 214 may perform an optimization process and add time information to the first trajectory candidate. Specifically, the first optimization unit 214 may perform time optimization of a multipoint trajectory in consideration of the current positions and velocities of the joints 12, that is high-speed processing. More specifically, the first optimization unit 214 performs the optimization process on the first trajectory candidate having no time information in consideration of acceleration constraints on the drive units 30 so that the operation is performed in a shorter time. The first optimization unit 214 sends the optimized first trajectory candidate to the trajectory generation device 230.

The second candidate generation device 220 includes a second candidate generation unit 221 and a second optimization unit 222.

The second candidate generation unit 221 is a specific example of the second candidate generation unit 102 shown in FIG. 1. The second candidate generation unit 221 calculates a second trajectory candidate using the rapidly-exploring random tree (RRT) method. Data necessary for the calculation using the RRT method may be stored in advance in a storage device of the second candidate generation device 220. The second trajectory candidate preferably satisfies a predetermined constraint condition. The second trajectory candidate does not include the operation time for the moving body 240 to move.

The second optimization unit 222 has the same configuration as the first optimization unit 214. As described above, since the second trajectory candidate does not include the operation time for the moving body 240 to move, the second optimization unit 222 preferably performs optimization and gives time information to the second trajectory candidate. The second optimization unit 222 sends the optimized second trajectory candidate to the trajectory generation device 230.

The trajectory generation device 230 includes an acquisition unit 231 and a trajectory generation unit 232.

The acquisition unit 231 acquires information necessary to generate the trajectory 70. Such information includes, for example, target moving body information, environment information, and current state information of the moving body 240. The target moving body information is, for example, the target position G and attitude of the moving body 240, the grip unit 20, or the main body 10, and the angles and translational displacements of the joints 12. The target moving body information may include a plurality of target positions G. Each piece of target moving body information may be set within a predetermined range. The environment information represents the environment in which the moving body 240 is placed using a three-dimensional point group. The environment information may be acquired by the sensor 40 shown in FIGS. 2 and 3 or a sensor provided in advance in the environment in which the moving body 240 is placed. In order to reduce the processing time of the first check unit 213, the environment information may be thinned out as appropriate. The current state information of the moving body 240 indicates at least one of the following: the current states of the joints 12 of the moving body 240 and the current moving state. The states of the joints 12 are, for example, angle, translational displacement, and velocity. The current moving state of the moving body 240 is, for example, position, attitude, and velocity. The information acquired by the acquisition unit 231 may be output to the first candidate generation device 210 and the second candidate generation device 220 as appropriate. The information acquired by the acquisition unit 231 is used as, for example, the grip conditions to be used by the first candidate generation device 210 described above.

The trajectory generation unit 232 is a specific example of the trajectory generation unit 103 shown in FIG. 1. There are cases where the first candidate generation unit 211 generates a first trajectory candidate determined to be passable by the moving body 240, before the second trajectory candidate is generated. In such a case, the trajectory generation unit 232 generates the trajectory 70 using the first trajectory candidate determined to be passable by the moving body 240. There are also cases where the second candidate generation unit 221 generates a second trajectory candidate before the passable first trajectory candidate is generated. In such a case, the trajectory generation unit 232 generates the trajectory 70 using the generated second trajectory candidate. The trajectory generation unit 232 continues to generate the trajectory 70 at a fixed period.

The second check unit 250 determines whether the moving body 240 can avoid an interfering object based on the operation performed by the moving body 240. Specifically, the second check unit 250 sorts the operation of the moving body 240 according to the trajectory 70 generated by the trajectory generation unit 232 and the operation currently being performed by the moving body 240 in order of time until the operation currently being performed by the moving body 240 is completed. The second check unit 250 determines whether the sorted operations can avoid an interfering object. Since the operation of the moving body 240 according to the trajectory 70 can avoid an interfering object, the second check unit 250 may determine only the operation currently being performed by the moving body 240. Since the second check unit 250 according to the first embodiment makes a determination based on both the operation currently being performed by the moving body 240 and the operation of the moving body 240 according to the trajectory 70 generated by the trajectory generation unit 232, it is easy to implement the second check unit 250. The second check unit 250 sends the trajectory 70 to the moving body 240. The moving body 240 acquires the trajectory 70 and controls each component of the moving body 240 along the trajectory 70 to move from the start position S to the target position G.

Trajectory Generation Method

Figure 5:
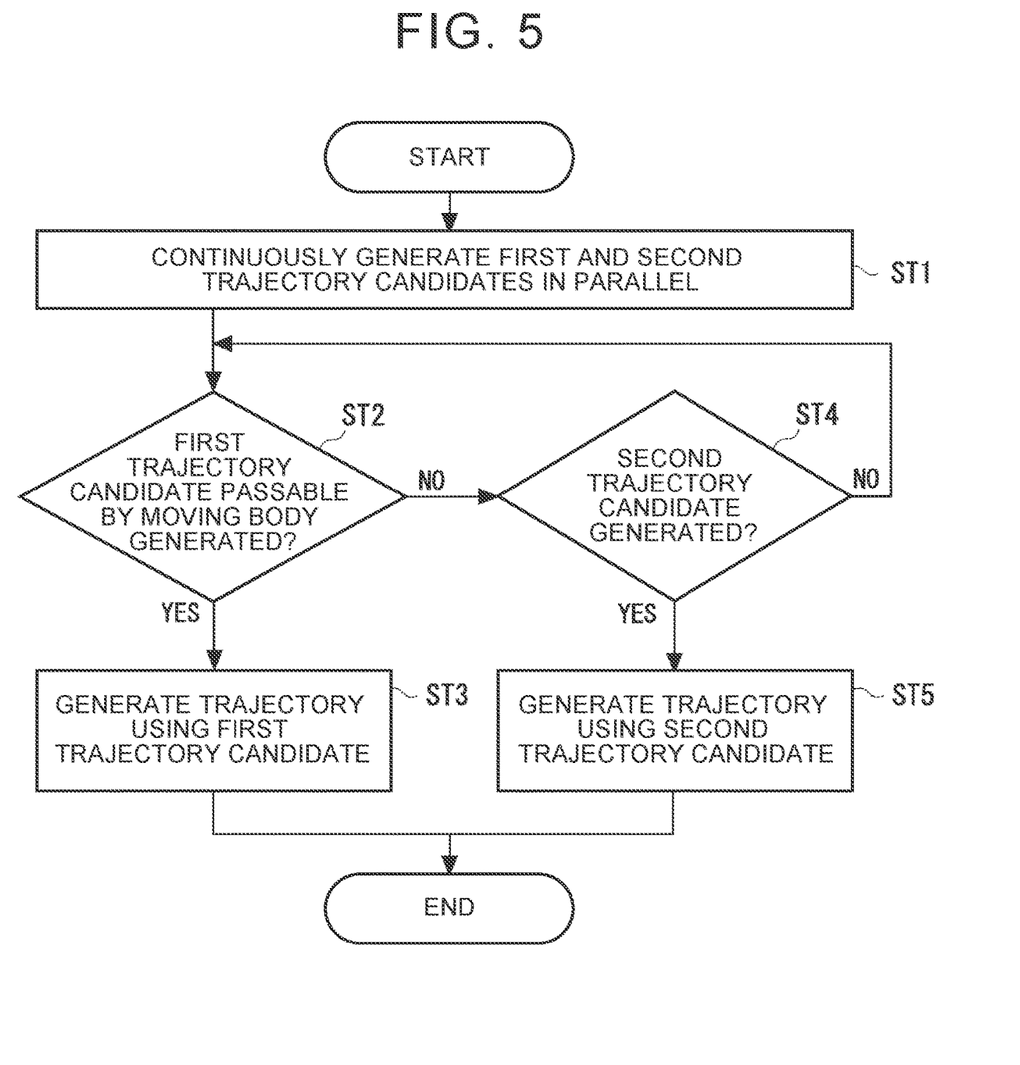
FIG. 5 is a flowchart illustrating a trajectory generation method according to the first embodiment.

Next, a trajectory generation method according to the first embodiment will be described with reference to FIG. 5. The trajectory generation method can be implemented using the trajectory generation system 200 shown in FIG. 2.

First trajectory candidates and second trajectory candidates are generated in parallel (step ST1).

Subsequently, it is determined whether a first trajectory candidate that is passable by the moving body has been generated (step ST2).

When a first trajectory candidate that is passable by the moving body is generated (step ST2: YES), a trajectory is generated using the first trajectory candidate that is passable by the moving body (step ST3).

On the other hand, when a first trajectory candidate that is passable by the moving body has not yet been generated (step ST2: NO), it is determined whether a second trajectory candidate has been generated (step ST4).

When a second trajectory candidate has been generated (step ST4: YES), a trajectory is generated using the second trajectory candidate (step ST5). When a second trajectory candidate has not yet been generated (step ST4: NO), the process returns to step ST2.

A trajectory can thus be generated. According to the trajectory generation method according to the first embodiment, when a first trajectory candidate that is passable by the moving body is generated, a trajectory is generated using the first trajectory candidate that is passable by the moving body. The generation rate of the first trajectory candidates is higher than that of the second trajectory candidates. A trajectory can thus be quickly generated. When a second trajectory candidate is generated before a first trajectory candidate that is passable by the moving body is generated, a trajectory is generated using the second trajectory candidate. The likelihood of a second trajectory candidate being passable by the moving body are higher than the likelihood of a first trajectory candidate being passable by the moving body. Therefore, even when a first trajectory candidate that is passable by the moving body cannot be generated, a trajectory can be generated using a second trajectory candidate that is highly likely to be passable by the moving body. This can reduce the possibility that a trajectory cannot be generated.

According to such a trajectory generation method, in an environment with a small number of interfering objects, for example, a trajectory is generated using a first trajectory candidate that is passable by the moving body. Therefore, a trajectory can be generated quickly. On the other hand, in an environment with a large number of interfering objects, a trajectory is generated using a second trajectory candidate that is highly likely to be passable by the moving body. This can reduce the possibility that a trajectory cannot be generated. A trajectory that is highly likely to be passable by the moving body can be generated at a high speed according to a change in position of an interfering object. Such a trajectory generation method is suitable in an environment where the position of an interfering object changes such as in a home environment.

Calculation Example

Next, a calculation example using the trajectory generation system 200 according to the first embodiment will be described with reference to FIGS. 6 to 9.

Figure 6:
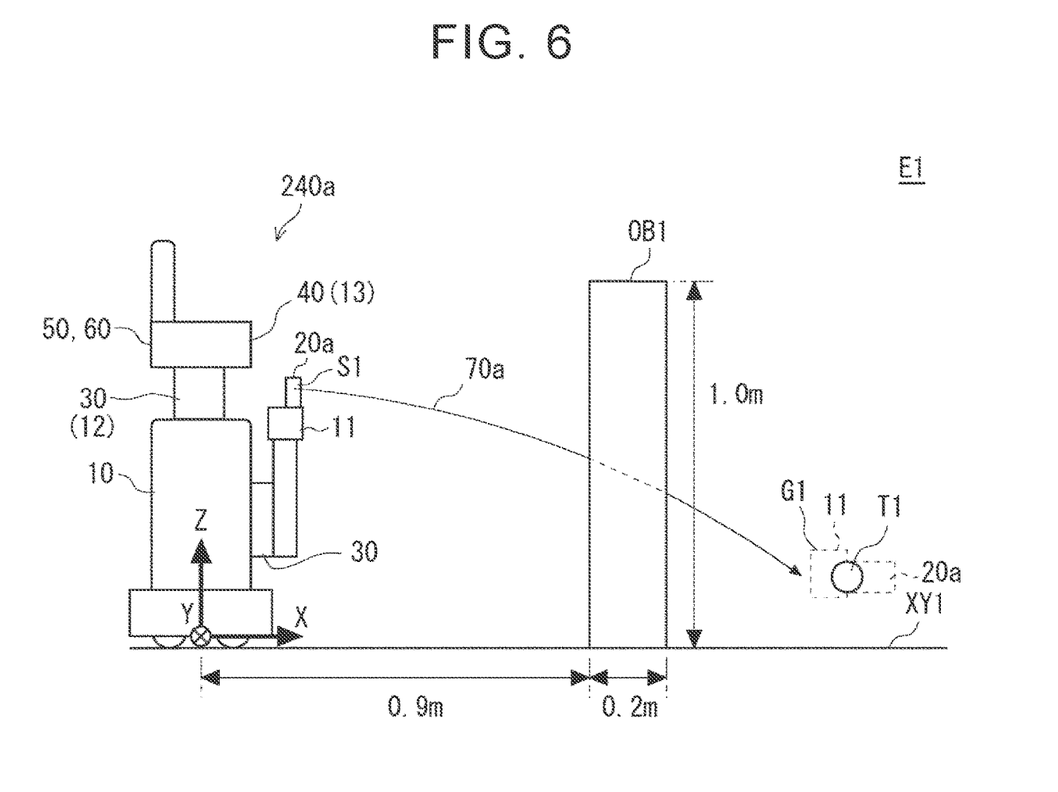
FIG. 6 illustrates a trajectory generated by a trajectory generation unit of the trajectory generation system according to the first embodiment.

A right-handed xyz coordinate system shown in FIG. 6 and other figures is herein used for convenience in order to illustrate the positional relationship among constituent elements. Normally, the positive direction of the Z axis is a vertically upward direction and the XY plane is a horizontal plane, which is common among the figures.

In the calculation example, a trajectory was generated using a trajectory generation system having the same configuration as the trajectory generation system 200. A moving body 240*a* that is a specific example of the moving body 240 moves along the generated trajectory. The period at which the trajectory generation unit 232 generates the trajectory 70 was set to 100 msec. Each condition was set so that the first candidate generation device 210 was operable in many home environments. For example, the number of interpolation points of the first candidate generation unit 211 was set to 100.

In Comparative Examples 1 and 2, a trajectory was generated under the same conditions as in the calculation example except for the trajectory generation system. A trajectory generation system used in Comparative Example 1 has the same configuration as the trajectory generation system 200 except that the trajectory generation system of Comparative Example 1 does not include the second candidate generation device 220. A trajectory generation system used in Comparative Example 2 has the same configuration as the trajectory generation system 200 except that the trajectory generation system of Comparative Example 2 does not include the first candidate generation device 210.

An environment E1 and an environment E2 were prepared using a 3D model virtual simulator, specifically, a Gazebo simulator, as an experimental environment.

Figure 7:
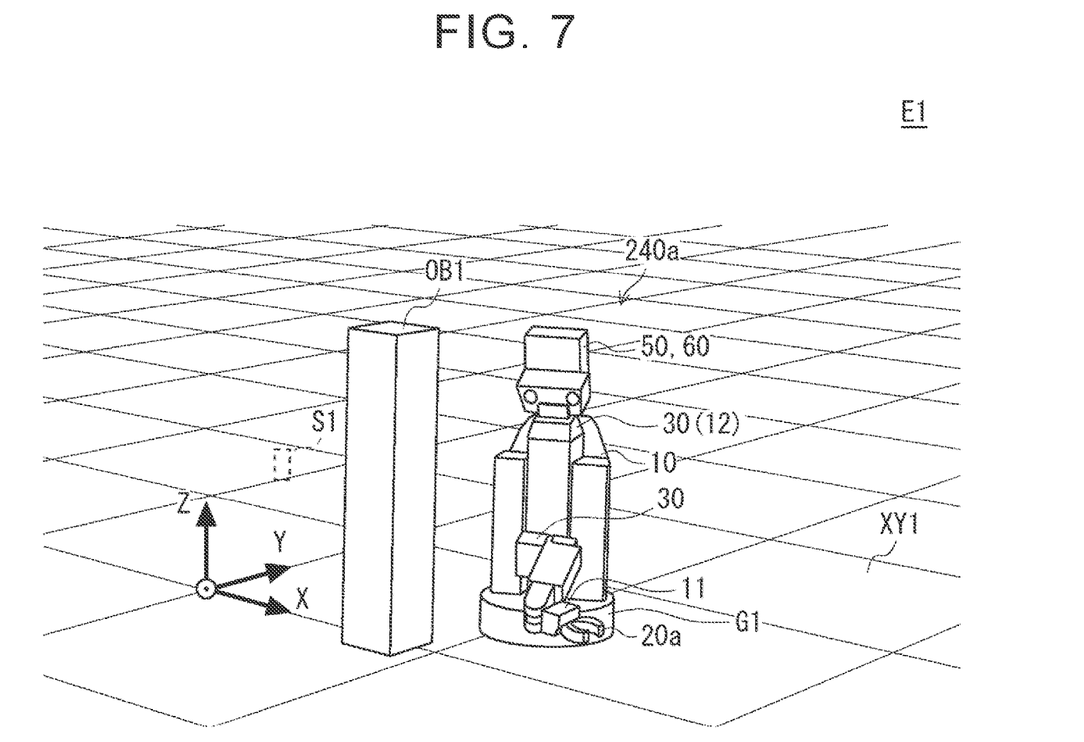
FIG. 7 shows an example in which the moving body according to the first embodiment has moved along a trajectory.

As shown in FIGS. 6 and 7, in the environment E1, a target position G1 is located in an open space on a floor surface XY1. There is no interfering object OB1 at the time the trajectory generation system starts operating. The interfering object OB1 appears when 0.5 sec have passed since the start of the operation of the trajectory generating system. The interfering object OB1 is located between a start position S1 and the target position G1. The target position G1 is located 1.5 m forward (in the positive direction of the X-axis) of the start position S1 and at a height (in the positive direction of the Z-axis) of 0.2 m. In the environment E1, a grip unit 20*a* of the moving body 240*a* moves along a trajectory 70*a*.

Figure 8:
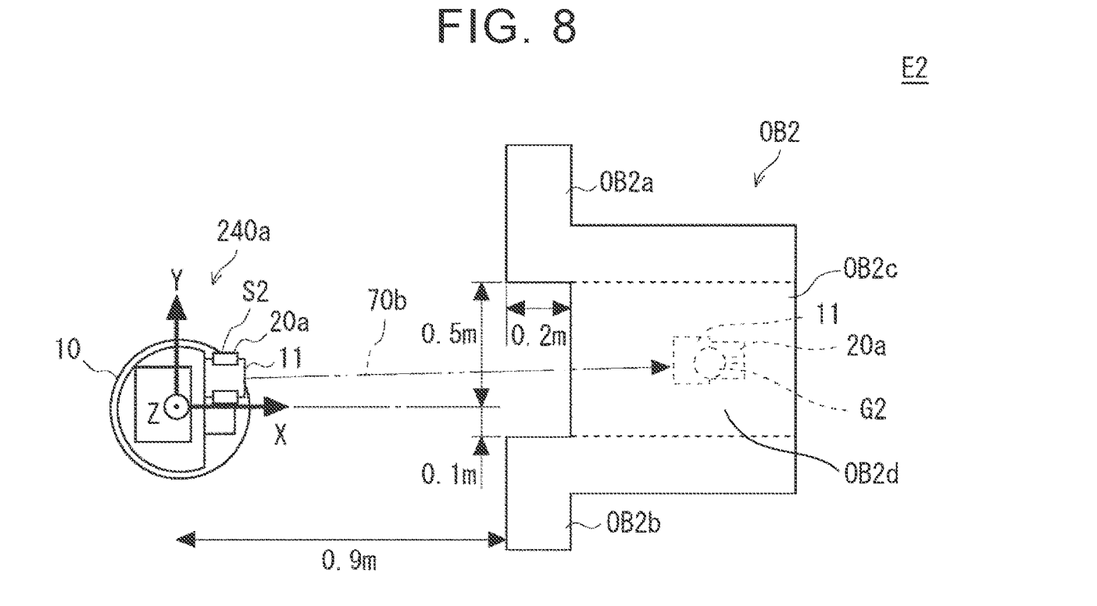
FIG. 8 illustrates a trajectory generated by the trajectory generation unit of the trajectory generation system according to the first embodiment.
Figure 9:
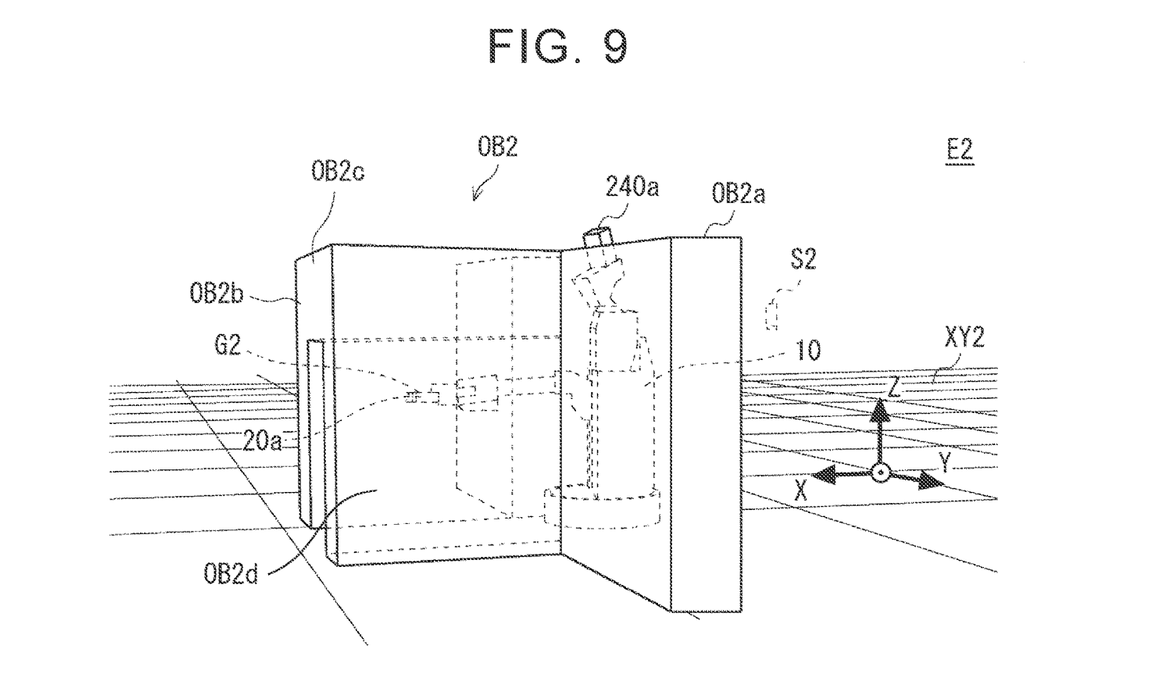
FIG. 9 shows an example in which the moving body according to the first embodiment has moved along a trajectory.

As shown in FIGS. 8 and 9, in the environment E2, a target position G2 is located inside an interfering object OB2, that is, in a space OB2*d* surrounded by walls OB2*a*, OB2*b* and ceiling OB2*c* of the interfering object OB2 and a floor surface XY2. The target position G2 is located 1.5 m forward (in the positive direction of the X-axis) of a start position S2, 0.2 m to the left (in the positive direction of the Y-axis) of the start position S2, and at a height (in the positive direction of the Z-axis) of 0.5 m. The height of the space OB2*d* is 0.7 m. In the environment E2, the grip unit 20*a* of the moving body 240*a* moves along a trajectory 70*b*. The moving body 240*a* needs to insert the grip unit 20 into the space OB2*d* in order to move the grip unit 20 to the target position G2. The space OB2d is narrower than the open space where the target position G1 is located in the environment E1. Therefore, it is difficult for the first candidate generation unit 211 to generate a first trajectory candidate for moving the grip unit 20 to the target position G2 while avoiding the interfering object OB2.

In the calculation example and Comparative Examples 1 and 2, the time from when the trajectory generation system output the first trajectory and the moving body 240a started operating until the moving body 240a reached the target position from the moving body start position was measured for the environments E1 and E2. The measured times are shown in Table 1. When the first candidate generation unit 211 generated a first trajectory candidate 100 times and the first check unit 213 determined that all of the first trajectory candidates were not passable by the moving body 240, it was determined that it was not possible to generate a passable trajectory.

TABLE 1

|  | Operation Time in Environment E1 (sec) | Operation Time in Environment E2 (sec) |
| --- | --- | --- |
| Calculation Example | 9.72 | 6.10 |
| Comparative Example 1 | 9.78 | — |
| Comparative Example 2 | 14.80 | 6.62 |

As shown in Table, the operation time in the environment according to the calculation example is almost the same as that according to Comparative Example 1, and is shorter than that according to Comparative Example 2. One of the reasons for this is that, in the calculation example and Comparative Example 1, the moving body 240a moved along the trajectory generated using the first candidate, whereas in Comparative Example 2, the moving body 240a moved along the trajectory generated using the second candidate.

The operation time in the environment E2 according to the calculation example was almost the same as that according to Comparative Example 2. The operation time in the environment E2 according to Comparative Example 1 could not be measured. The reason for this is that, in the calculation example and Comparative Example 2, the moving body 240a moved along the trajectory generated using the second candidate, whereas in Comparative Example 1, a trajectory could not be generated using the first trajectory candidate for moving the grip unit 20 to the target position G2 while avoiding the interfering object OB2.

OTHER EMBODIMENTS ETC

Figure 10:
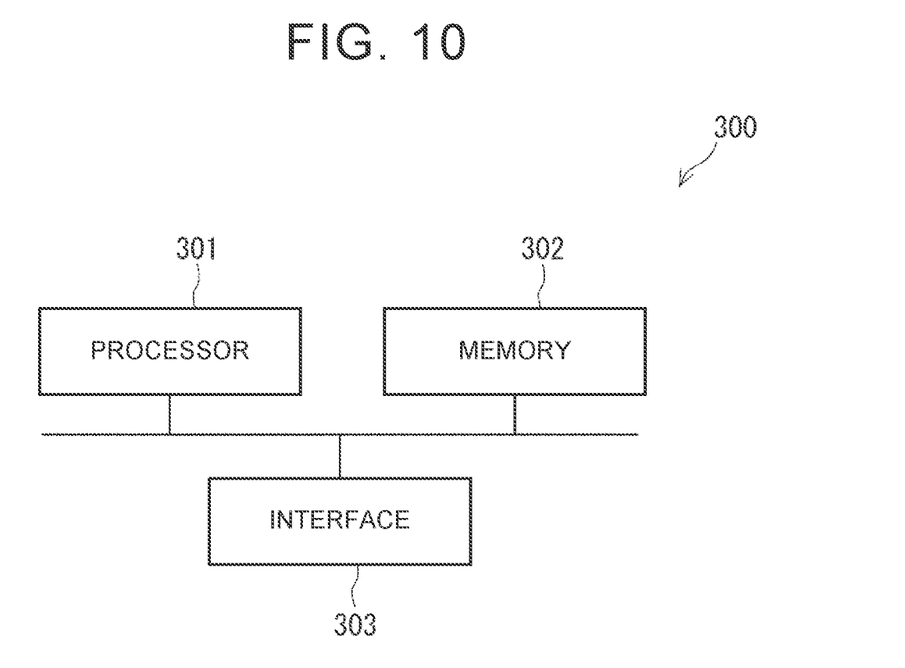
FIG. 10 shows an example of a configuration included in the trajectory generation system.

The trajectory generation system according to the above embodiment may include the following hardware configuration. FIG. 10 shows an example of a configuration included in the trajectory generation system. Like the processing procedures in the trajectory generation system described above in the various embodiments, the present disclosure may be in the form of a processing method.

A control device 300 shown in FIG. 10 includes a processor 301 and a memory 302 together with an interface 303. The configurations of the trajectory generation systems 100 (see FIG. 1), 200 (see FIG. 4) described in the above embodiments are implemented by the processor 301 reading and executing a program stored in the memory 302. That is, this program is a control program that causes the processor 301 to function as the trajectory generation system 100, 200 or a part thereof.

The above program includes a group of instructions (or software codes) for causing the computer to perform one or more of the functions described in the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), or other memory technologies, a compact disc read-only memory (CD-ROM), a digital versatile disc (DVD), a Blu-ray (registered trademark) disc, or other optical disc storages, a magnetic cassette, a magnetic tape, a magnetic disk storage, or other magnetic storage devices. The program may be transmitted on a transitory computer-readable medium or a communication medium. Examples of the transitory computer-readable medium or the communication medium include, but are not limited to, an electrical, optical, acoustic, or other forms of propagating signals.

Like the processing procedures in the trajectory generation system 100 and the trajectory generation system 200 described above in the various embodiments, the present disclosure may be in the form of the trajectory generation method for the trajectory generation system 100 and the trajectory generation system 200. It can be said that the above program is a program for causing the trajectory generation system 100 and the trajectory generation system 200 to perform such a trajectory generation method.

The present disclosure is not limited to the embodiments described above, and may be modified as appropriate without departing from the spirit and scope of the present disclosure. The present disclosure may be carried out by combining the above embodiments and examples thereof as appropriate. For example, the trajectory generation method according to the first embodiment shown in FIG. 5 may include a different step instead of steps ST2 to ST4. In this step, for example, a trajectory may be generated using either or both of the first and second trajectory candidates generated in step ST1 and passable by the moving body 240. The above program may cause the trajectory generation system 100 and the trajectory generation system 200 to perform such a trajectory generation method.

What is claimed is:

1. A trajectory generation system comprising one or more processors configured to:
set a start position and a target position of a plurality of first trajectory candidates and a second trajectory candidate;
start a generation of the plurality of first trajectory candidates and the second trajectory candidate from the start position to the target position simultaneously;
determine whether a moving body is able to pass through at least one of the plurality of first trajectory candidates while avoiding an interfering object, when a first predetermined period is passed after the start of the generation of the plurality of first trajectory candidates and the second trajectory candidate;
generate a trajectory using the one of the plurality of first trajectory candidates which is determined that the moving body is able to pass through in a case where the one or more processors determine that the moving body is able to pass through the at least one of the plurality of first trajectory candidates while avoiding the interfering object;

determine whether the second trajectory candidate is generated in a case where the one or more processors determine that the moving body is not able to pass through the at least one of the plurality of first trajectory candidates while avoiding the interfering object; and generate the trajectory using the second trajectory candidate in a case where the one or more processors determine that the second trajectory candidate is generated, wherein the one or more processors are configured to periodically connect a plurality of microtrajectories to the start position of the plurality of first trajectory candidates or an immediately preceding microtrajectory at every second predetermined period and generate the plurality of the first trajectory candidates by sequentially connecting the plurality of the microtrajectories from the start position to the target position, the plurality of the microtrajectories is a part along which the moving body or a grip unit of the moving body moves in the predetermined period, and is a part on the start position side of the plurality of the first trajectory candidates, and generate the second trajectory candidate using a rapidly-exploring random tree method.

2. The trajectory generation system according to claim 1, wherein a third period from setting the start position and the target position to generating the trajectory is 100 msec.

3. The trajectory generation system according to claim 1, wherein a three dimensional interference determination at points in the plurality of first trajectory candidates is performed in a case where the one or more processors determine whether the moving body is able to pass through the at least one of the plurality of first trajectory candidates while avoiding the interfering object.

4. A trajectory generation method that is performed by a trajectory generation system, the trajectory generation method comprising:

setting a start position and a target position of a plurality of first trajectory candidates and a second trajectory candidate;

starting a generation of the plurality of first trajectory candidates and the second trajectory candidate from the start position to the target position simultaneously;

determining whether a moving body is able to pass through at least one of the plurality of first trajectory candidates while avoiding an interfering object, when a first predetermined period is passed after the start of the generation of the plurality of first trajectory candidates and the second trajectory candidate;

generating a trajectory using the one of the plurality of first trajectory candidates which is determined that the moving body is able to pass through in a case where the moving body is determined to be able to pass through the at least one of the plurality of first trajectory candidates while avoiding the interfering object;

determining whether the second trajectory candidate is generated in a case where the moving body is determined to not able to pass through the at least one of the plurality of first trajectory candidates while avoiding the interfering object; and generating the trajectory using the second trajectory candidate in a case where the second trajectory candidate is determined to be generated, wherein:

a plurality of microtrajectories are periodically connected to the start position of the plurality of first trajectory candidates or an immediately preceding microtrajectory at every second predetermined period and the plurality of the first trajectory candidates are generated by sequentially connecting the plurality of the microtrajectories from the start position to the target position, the plurality of the microtrajectories is a part along which the moving body or a grip unit of the moving body moves in the predetermined period, and is a part on the start position side of the plurality of the first trajectory candidates, and the second trajectory candidate is generated using a rapidly-exploring random tree method.

5. A non-transitory storage medium storing instructions that are executable by one or more processors and that cause the one or more processors to perform functions comprising:

setting a start position and a target position of a plurality of first trajectory candidates and a second trajectory candidate;

starting a generation of the plurality of first trajectory candidates and the second trajectory candidate from the start position to the target position simultaneously;

determining whether a moving body is able to pass through at least one of the plurality of first trajectory candidates while avoiding an interfering object, when a first predetermined period is passed after the start of the generation of the plurality of first trajectory candidates and the second trajectory candidate;

generating a trajectory using the one of the plurality of first trajectory candidates which is determined that the moving body is able to pass through in a case where the moving body is determined to be able to pass through the at least one of the plurality of first trajectory candidates while avoiding the interfering object;

determining whether the second trajectory candidate is generated in a case where the moving body is determined to not able to pass through the at least one of the plurality of first trajectory candidates while avoiding the interfering object; and generating the trajectory using the second trajectory candidate in a case where the second trajectory candidate is determined to be generated, wherein:

a plurality of microtrajectories are periodically connected to the start position of the plurality of first trajectory candidates or an immediately preceding microtrajectory at every second predetermined period and the plurality of the first trajectory candidates are generated by sequentially connecting the plurality of the microtrajectories from the start position to the target position, the plurality of the microtrajectories is a part along which the moving body or a grip unit of the moving body moves in the predetermined period, and is a part on the start position side of the plurality of the first trajectory candidates, and the second trajectory candidate is generated using a rapidly-exploring random tree method.

6. The trajectory generation method according to claim 4, wherein a third period from setting the start position and the target position to generating the trajectory is 100 msec.

7. The trajectory generation method according to claim 4, wherein a three dimensional interference determination at points in the plurality of first trajectory candidates is performed in a case where the moving body is determined to be able to pass through the at least one of the plurality of first trajectory candidates while avoiding the interfering object.

8. The non-transitory storage medium according to claim 5, wherein a third period from setting the start position and the target position to generating the trajectory is 100 msec.

9. The non-transitory storage medium according to claim 5, wherein a three dimensional interference determination at points in the plurality of first trajectory candidates is performed in a case where the moving body is determined to be able to pass through the at least one of the plurality of first trajectory candidates while avoiding the interfering object.

* * * * *